US010259958B2

(12) United States Patent
Van Hout et al.

(10) Patent No.: US 10,259,958 B2
(45) Date of Patent: Apr. 16, 2019

(54) INK COMPOSITION

(71) Applicant: Océ-Technologies B.V., Venlo (NL)

(72) Inventors: Richard F. E. Van Hout, Venlo (NL); Richard Van Hameren, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/613,886

(22) Filed: Jun. 5, 2017

(65) Prior Publication Data

US 2017/0267882 A1 Sep. 21, 2017

Related U.S. Application Data

(63) Continuation of application No. PCT/EP2015/079260, filed on Dec. 10, 2015.

(30) Foreign Application Priority Data

Dec. 18, 2014 (EP) .................................. 14198894
Jun. 8, 2015 (EP) .................................. 15171059

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/101* | (2014.01) | |
| *C09D 11/30* | (2014.01) | |
| *C09D 11/34* | (2014.01) | |
| *C09D 11/38* | (2014.01) | |
| *C09D 11/326* | (2014.01) | |
| *B41J 2/01* | (2006.01) | |
| *B41J 11/00* | (2006.01) | |
| *C09D 11/03* | (2014.01) | |
| *C09D 11/107* | (2014.01) | |

(52) U.S. Cl.
CPC ............... *C09D 11/101* (2013.01); *B41J 2/01* (2013.01); *B41J 11/002* (2013.01); *C09D 11/03* (2013.01); *C09D 11/107* (2013.01); *C09D 11/30* (2013.01); *C09D 11/326* (2013.01); *C09D 11/34* (2013.01); *C09D 11/38* (2013.01)

(58) Field of Classification Search
CPC ....... C09D 11/101; C09D 11/38; C09D 11/34; C09D 11/326; C09D 11/107; C09D 11/30; C09D 11/03; B41J 11/002; B41J 2/01
USPC .................................. 522/182, 178, 1; 520/1
See application file for complete search history.

(56) References Cited

U.S. PATENT DOCUMENTS

| | | | |
|---|---|---|---|
| 2011/0263769 A1 | 10/2011 | Chopra et al. | |
| 2013/0035428 A1* | 2/2013 | Carlini | C09D 11/34 524/95 |
| 2013/0038668 A1* | 2/2013 | Kaga | C09D 11/101 347/102 |

FOREIGN PATENT DOCUMENTS

| | | | |
|---|---|---|---|
| EP | 1 849 842 A1 | 10/2007 | |
| EP | 2 565 044 A1 | 3/2013 | |

OTHER PUBLICATIONS

European Search Report issued in EP 14 19 8894, dated Jun. 10, 2015.
International Search Report (PCT/ISA/210) issued in PCT/EP2015/079260, dated Feb. 17, 2016.
Written Opinion of the International Searching Authority (PCT/ISA/237) issued in PCT/EP2015/079260, dated Feb. 17, 2016.

* cited by examiner

*Primary Examiner* — Jessica Whiteley
(74) *Attorney, Agent, or Firm* — Birch, Stewart, Kolasch & Birch, LLP

(57) ABSTRACT

The present invention relates to a radiation curable ink composition comprising an ester compound, that is suitable for printing high gloss images. The invention further relates to a method for making such ink composition and a printing method using such ink composition.

14 Claims, 2 Drawing Sheets

INK COMPOSITION

CROSS REFERENCE TO RELATED APPLICATIONS

This application is a Continuation of PCT International Application No. PCT/EP2015/079260, filed on Dec. 10, 2015, which claims priority under 35 U.S.C. 119(a) to Patent Application No. 14198894.9, filed in Europe on Dec. 18, 2014, and to Patent Application No. 15171059.7, filed in Europe on Jun. 8, 2015, all of which are hereby expressly incorporated by reference into the present application.

The present invention relates to an ink composition. The present invention further relates to a method for preparing an ink composition. In addition, the present invention relates to a method for applying an image onto a recording medium. The present invention also relates to use of an ester compound in an ink composition for obtaining high gloss.

BACKGROUND OF THE INVENTION

Radiation-curable inkjet ink compositions are known in the art. These ink compositions comprise one or more radiation curable components. A special class of radiation curable inkjet ink compositions are phase change radiation curable inkjet ink compositions. These inks are fluid at elevated temperature and become solid—even if not yet cured—at lower temperatures. These inks are typically jetted at elevated temperatures. Phase change inks may become solid or semi-solid upon cooling down on a recording medium, e.g. a sheet of paper. As a result, spread of a droplet of ink on the recording medium may be decreased and color bleeding may be prevented.

An example of a phase change radiation curable inkjet ink is a gelling radiation curable inkjet ink. Gelling radiation curable inkjet ink may be jetted at elevated temperature and may undergo a rapid increase in viscosity when being jetted onto a recording medium. Because of the increase in viscosity, the droplets of ink jetted onto the recording medium may not spread much and hence, color bleeding may be prevented even if the ink composition is not immediately cured after being applied onto the recording medium. The gelling behavior may be provided by adding a suitable gellant to the radiation curable ink composition. Gelling radiation curable inkjet ink compositions typically comprise a gellant. Gellants are also known in the art as gelling agents or thickeners. Examples of gellants used in gelling radiation curable inkjet ink compositions are waxes, such as natural waxes and long chain carboxylic acids, and ketones. A disadvantage of these gellants is that images printed using an ink composition comprising such gellant generally show low or medium gloss level, while high gloss is desired for images printed using a radiation curable ink. There is a need for gelling radiation curable ink compositions that provide high gloss images.

It is therefore an object of the present invention to provide a gelling radiation curable ink composition that provides high gloss images.

SUMMARY OF THE INVENTION

The object of the invention is achieved in a radiation-curable inkjet ink composition comprising a radiation curable component, the radiation-curable inkjet ink composition further comprising an ester compound, the ester compound consisting essentially of a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group and wherein the ester compound is present in an amount of 0.3 wt %-3.0 wt % based on the total weight of the radiation-curable inkjet ink composition.

Radiation Curable Medium

The radiation curable inkjet ink composition may comprise a radiation curable medium. The radiation curable medium may comprise at least one radiation curable component. A radiation curable component is a component that may react (e.g. polymerize) under influence of suitable radiation, such as electromagnetic radiation, e.g. ultraviolet (UV) radiation. Examples of radiation curable components are epoxides and (meth)acrylates. (Meth-)acrylates may comprise one or more reactive groups for forming an acrylate polymer. The radiation curable medium may comprise one type of radiation curable compound or alternatively, the radiation curable medium may comprise a mixture of radiation curable compounds.

The radiation curable medium may further comprise at least one inhibitor. An inhibitor is a component that prevent (inhibits) unwanted polymerization of the radiation curable compound. Inhibitors may be added to the radiation curable inkjet ink composition to increase the shelf life on the ink composition.

The radiation curable medium may further comprise at least one photo initiator. A photo initiator is a component that improves the efficiency of curing; i.e. increases the polymerization rate when the ink composition is irradiated with suitable radiation, such as UV radiation.

The radiation curable medium may further comprise a solvent, such as water or an organic solvent. The solvent may be added to the radiation curable medium to tune ink properties, such as viscosity.

Further, additional components may be added to the radiation curable medium. For example, the radiation curable medium may comprise surfactants, antibacterial components and anti-fungi components.

Colorant

The radiation curable inkjet ink composition may further a colorant, such as a pigment, a dye or a mixture thereof. Further, the radiation curable inkjet ink composition may comprise a mixture of dyes and/or a mixture of pigments. The colorant may provide the ink composition with a predetermined color.

Ester Compound

The radiation curable inkjet ink composition may further comprise an ester compound. According to the present invention, the ester compound consists essentially of a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group.

Hence, the ester compound may consist essentially of a condensation product of a first reactant and a second reactant, wherein the first reactant is a compound A comprising at least 3 hydroxyl functional group functional groups and wherein the second reactant comprises at least one compound B, wherein the at least one compound B comprises a carboxylic functional group. Alternatively, the ester compound may consist essentially of a condensation product of a first reactant and a second reactant, wherein the first reactant is a compound A comprising at least 3 carboxylic acid functional groups and wherein the second reactant comprises at least one compound B, wherein the at least one compound B comprises a hydroxyl functional group.

Preferably, compound B comprises only one second group. In case the second group is a hydroxyl functional group, the compound B preferably comprises only one hydroxyl functional group. In case the second group is a carboxylic acid group, the compound B preferably comprises only one carboxylic acid group.

The ester compound formed by reacting the first reactant and the second reactant may be a nonlinear ester compound. The ester compound may comprise at least three ester groups. The ester compound may provide the radiation curable inkjet ink composition with gelling properties.

The ester compound may be used as a gelling agent in a radiation-curable inkjet ink composition for obtaining a glossy image.

An ink composition comprising an ester compound in accordance with the present invention may be capable of providing high gloss images. The ester compound may form a 3-dimensional network in the ink composition upon cooling down, thereby changing the rheological properties of the ink composition. Hence, when the droplets of ink cool down after being jetted onto a recording medium, the viscosity of the ink may increase and excessive flow of the ink droplets may be prevented, thereby preventing colorbleed.

The ester compound may be present in an amount of 0.3 wt %-3.0 wt % based on the total weight of the radiation-curable inkjet ink composition. Preferably, the ester compound may be present in an amount of 0.5 wt %-2.5 wt % based on the total weight of the radiation-curable inkjet ink composition, more preferably from 0.8 wt %-2.2 wt %, for example from 1.0 wt %-2.0 wt %.

In case the ink composition comprises less than 0.3 wt % of the ester compound based on the total weight of the radiation-curable inkjet ink composition, then the increase in viscosity of the ink after printing on the recording medium may be insufficient to prevent color bleeding. Hence, too little ester compound may result in decreased print quality. In case the ink composition comprises more than 3.0 wt % of the ester component, then the gloss level of the printed image may decrease.

In an embodiment, the ester compound does not comprise a (meth)acrylate functional group and/or a vinyl functional group. The ester compound therefore may not undergo a polymerization reaction upon irradiating the ink composition with actinic energy radiation, such as UV radiation.

In an embodiment, gloss of an image may be determined using a micro-TRI gloss meter obtained from BYK-Gardner GmbH using the internal calibration and measurement method. In case the gloss level measured under an angle of 60° is at least 35, preferably at least 40, the image may be considered to be a high gloss image. In case the gloss level measured under an angle of 60° is less than 35, the image may be considered a low gloss image (matt).

In an embodiment, the compound A is selected from the group consisting of pentaerythritol, cyclodextrine, glycerol, dipentaerythritol, 2-(hydroxymethyl)-2-methylpropane-1,3-diol, 2-ethyl-2-(hydroxymethyl)propane-1,3-diol, 2-(hydroxymethyl)propane-1,3-diol, trimethylolethane, trimethylolpropane, trimethylolbutane and trimethylolpentane.

These compounds are compounds comprising at least 3 hydroxyl functional groups. When reacted with a carboxylic acid, ester compounds can be formed.

Esters obtainable by reacting a carboxylic ester with a compound A selected from the above listed group may be esters having a branched structure (i.e. non-linear esters). Without wanting to be bound to any theory, it is believed that a branched structure may decrease the tendency of the ester compound to crystallize when cooling down. Hence, ester compound obtainable from the above mentioned polyalcohol components may not crystallize when cooling down. This may improve the gloss of a print made with an ink composition comprising such ester compound.

Methods for synthesizing ester compounds starting from a compound comprising a plurality of hydroxyl functional groups and a compound comprising a carboxylic acid group are known in the art.

In an embodiment, the compound B is a compound according to formula I, wherein R is an alkyl group, an aryl group or an alkylarylgroup, wherein R is a group having 5-30 carbon atoms.

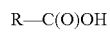
formula I:

Compounds according to formula I are suitable to form ester compounds in accordance with the present invention. The properties of the ester compound may be influenced by the choice of the functional group R. The nature of the R group may for example influence the melting point of the ester compound and the rate of diffusion of the ester compound in the inkjet ink composition. R may be an alkyl group, an aryl group or an alkylarylgroup. When the functional group R comprises an aromatic unit, then pi-pi-interaction may occur. Pi-pi interaction may assist in forming the intermolecular network upon cooling of the ink composition comprising the ester compound, which may be beneficial for the increase in viscosity of the ink composition when cooling down. The functional group R may be a group comprising 5-40 carbon atoms, preferably 10-25. When the functional group R comprises less than 5 carbon atoms, the ester compound may not show gelling behavior at printing conditions. When the functional group R comprises more than 40 carbon atoms, then the ester compound may not be fluid at jetting conditions, which may hamper the jetting of the inkjet ink composition. The ester compound may comprise only one type of functional group R. Alternatively, the ester compound may comprise a plurality of different R functional groups.

In a further embodiment, the compound B is a fatty acid. Fatty acids are suitable for forming esters, when reacted with a compound comprising an hydroxyl functional group. The fatty acids may be saturated or non-saturated fatty acids. Non-saturated fatty acids may be monounsaturated fatty acids or polyunsaturated fatty acids. Non-saturated fatty acids comprise an alkene functional group. Upon curing of the ink, the alkene functional group may react and the ester compound may be incorporated in the network formed by the radiation-curable component. Preferably, the fatty acid is a saturated fatty acid. When the compound B is a fatty acid, no so-called blooming of the ink may occur. Blooming is an unwanted phenomena that may occur in ink composition, such as radiation-curable ink composition comprising a gelling agent. After being applied onto a recording medium, a gelling agent present in the ink may cool down and may solidify, thereby forming a three-dimensional network that increases the viscosity of the ink. However, in the course of time, the gelling agent may migrate to the surface of the ink layer, which may result in matt print appearance. The phenomenon of decreased gloss due to migration of the gelling agent is known as "blooming". Without wanting to be bound to any theory, it is believed that by selecting compound B to be a fatty acid, an amorphous ester compound is obtained, that results in an ink composition that does not show blooming.

In a further embodiment, the ester compound is pentaerythritoltetrastearate. Pentaerythritoltetrastearate is an ester obtainable by reacting pentaerythritol and stearic acid. Stearic acid ($CH_3(C_2)_{16}COOH$) is a fatty acid.

In an embodiment, the radiation curable component is an acrylate having two or more acrylate functional groups. An acrylate may undergo a polymerization reaction when irradiated by suitable radiation, such as UV radiation. Hence, a polyacrylate polymer may be formed when an inkjet ink composition comprising an acrylate is cured, thereby hardening the ink. An acrylate molecule having two or more acrylate functional groups may react with two or more other acrylate molecules and hence, a polymeric network may be formed. Examples of acrylates having two or more acrylate functional groups are known in the art.

In a further embodiment, the ink composition further comprises a monofunctional acrylate. Presence of a monofunctional acrylate may improve the hardness and flexibility of the ink layer after curing.

In an embodiment, the ester compound is a gelling agent. The ester compound may be used as a gelling agent in a radiation-curable inkjet ink composition for obtaining a glossy image.

An ink composition comprising an ester compound in accordance with the present invention may be capable of providing high gloss images. The ester compound may form a 3-dimensional network in the ink composition upon cooling down, thereby changing the rheological properties of the ink composition. Hence, when the droplets of ink cool down after being jetted onto a recording medium, the viscosity of the ink may increase and excessive flow of the ink droplets may be prevented, thereby preventing colorbleed.

In an aspect of the invention, a method for preparing a radiation-curable inkjet ink composition is provided, the method comprising the steps of:
  providing a radiation-curable component;
  providing an ester compound in accordance with the present invention; and
  mixing the radiation-curable component and the ester compound.

The radiation-curable component and the ester compound may be provided. Optionally, additional components may be provided, for example an additional solvent. The radiation-curable component and the ester compound may be provided neat or they may be provided in a solution or dispersion. Optionally, a colorant may be provided. In case the colorant is a pigment, the pigment is preferably provided as a dispersion, such as an aqueous pigment dispersion. The components may be provided at once, or the components may be added subsequently. The components may be added in any suitable order. In case a dispersible component is added (pigment and/or latex particles), such dispersible component may be preferably added after the other components of the ink composition are provided. Mixing of the components may be carried out at any suitable temperature, for example room temperature.

In an aspect of the invention, a method for applying an image onto a recording medium is provided, the method comprising the steps of:
  a. jetting droplets of a radiation-curable inkjet ink composition according to the present invention onto the recording medium;
  b. curing the radiation-curable inkjet ink composition by irradiating the ink composition using UV radiation.

In the method, an image is applied onto a recording medium. In the method, in step a), an image is applied to the recording medium. The image may be applied using an ink composition according to the present invention. The ink composition may be applied onto the recording medium in a predetermined fashion, e.g. in accordance with image files stored on suitable storing means. The image may be applied for example by jetting droplets of the radiation-curable inkjet ink composition using an inkjet print head. The recording medium may be a sheet-like medium, such as a sheet of paper or a sheet of vinyl. Alternatively, the recording medium may be a web, for example an endless belt. The web may be made of a suitable material. Optionally, the image may be dried after it has been applied onto the intermediate transfer member.

In the method, in step b), the radiation-curable inkjet ink composition is cured by irradiating the ink composition using UV radiation. The inkjet ink composition may be irradiated using a suitable source of radiation, such as a halogen lamp, a mercury lamp and/or a LED lamp. Optionally, a plurality of sources of radiation may be used to irradiate the inkjet ink composition.

BRIEF DESCRIPTION OF THE DRAWINGS

These and further features and advantages of the present invention are explained hereinafter with reference to the accompanying drawings showing non-limiting embodiments and wherein.

In the drawings, same reference numerals refer to same elements.

DETAILED DESCRIPTION OF THE DRAWINGS

Figure 1A:
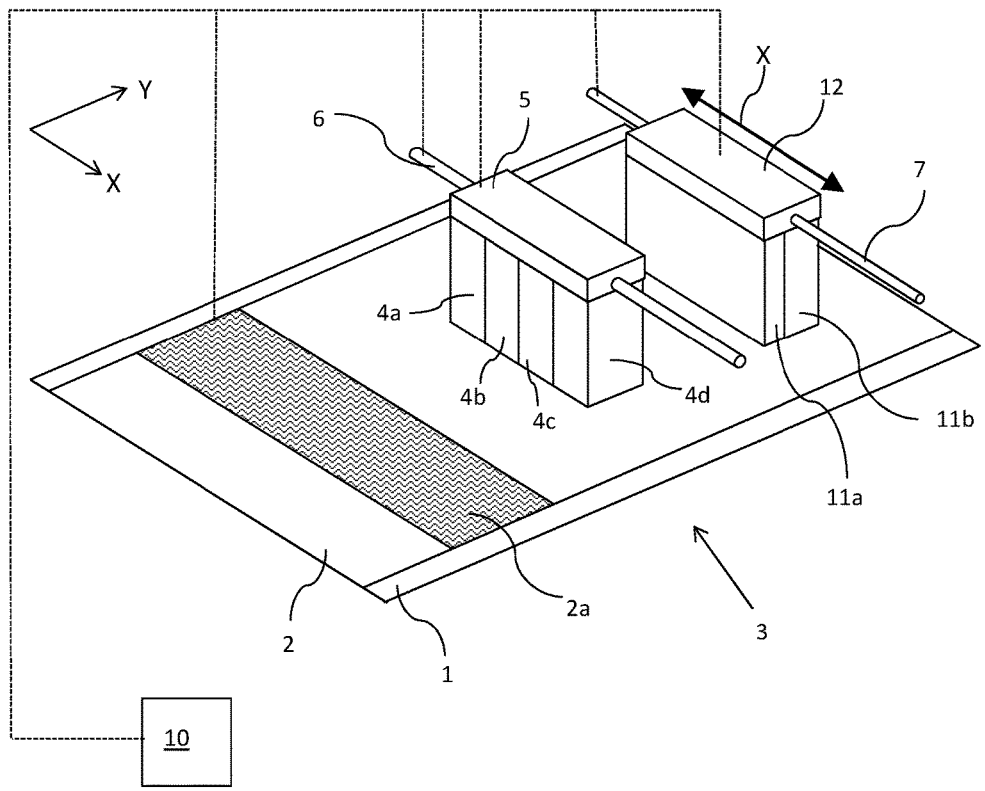
FIG. 1A shows a schematic representation of an inkjet printing system.
Figure 1B:
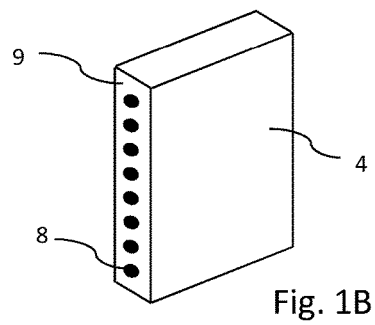
FIG. 1B shows a schematic representation of an inkjet print head.

FIG. 1A shows an ink jet printing assembly 3. The ink jet printing assembly 3 comprises supporting means for supporting an image receiving medium 2. The supporting means are shown in FIG. 1A as a flat surface 1, but alternatively, the supporting means may be a platen, for example a rotatable drum that is rotatable around an axis. The supporting means may be optionally provided with suction holes for holding the image receiving medium in a fixed position with respect to the supporting means. The ink jet printing assembly 3 comprises print heads 4a-4d, mounted on a scanning print carriage 5. The scanning print carriage 5 is guided by suitable guiding means 6 to move in reciprocation in the main scanning direction X. Each print head 4a-4d comprises an orifice surface 9, which orifice surface 9 is provided with at least one orifice 8, as is shown in FIG. 1B. The print heads 4a-4d are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is moved in the sub-scanning direction Y over the flat surface 1 along four print heads 4a-4d provided with a fluid marking material.

The image receiving medium 2, as depicted in FIG. 1A is locally heated or cooled in the temperature control region 2a. In the temperature control region 2A, temperature control means (not shown), such as heating and/or cooling means may be provided to control the temperature of the receiving medium 2. Optionally, the temperature control means may be integrated in the supporting means for supporting an image receiving medium 2. The temperature control means may be electrical temperature control means. The temperature control means may use a cooling and/or heating liquid to control the temperature of the image receiving medium 2. The temperature control means may further comprise a sensor (not shown) for monitoring the temperature of the image receiving medium 2.

A scanning print carriage 5 carries the four print heads 4a-4d and may be moved in reciprocation in the main scanning direction X parallel to the platen 1, such as to enable scanning of the image receiving medium 2 in the main scanning direction X. Only four print heads 4a-4d are depicted for demonstrating the invention. In practice an arbitrary number of print heads may be employed. In any case, at least one print head 4a-4d per color of marking material is placed on the scanning print carriage 5. For example, for a black-and-white printer, at least one print head 4a-4d, usually containing black marking material is present. Alternatively, a black-and-white printer may comprise a white marking material, which is to be applied on a black image-receiving medium 2. For a full-color printer, containing multiple colors, at least one print head 4a-4d for each of the colors, usually black, cyan, magenta and yellow is present. Often, in a full-color printer, black marking material is used more frequently in comparison to differently colored marking material. Therefore, more print heads 4a-4d containing black marking material may be provided on the scanning print carriage 5 compared to print heads 4a-4d containing marking material in any of the other colors. Alternatively, the print head 4a-4d containing black marking material may be larger than any of the print heads 4a-4d, containing a differently colored marking material.

The carriage 5 is guided by guiding means 6. These guiding means 6 may be a rod as depicted in FIG. 1A. Although only one rod 6 is depicted in FIG. 1A, a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

Each print head 4a-4d comprises an orifice surface 9 having at least one orifice 8, in fluid communication with a pressure chamber containing fluid marking material provided in the print head 4a-4d. On the orifice surface 9, a number of orifices 8 are arranged in a single linear array parallel to the sub-scanning direction Y, as is shown in FIG. 1B. Alternatively, the nozzles may be arranged in the main scanning direction X. Eight orifices 8 per print head 4a-4d are depicted in FIG. 1B, however obviously in a practical embodiment several hundreds of orifices 8 may be provided per print head 4a-4d,optionally arranged in multiple arrays.

As depicted in FIG. 1A, the respective print heads 4a-4d are placed parallel to each other. The print heads 4a-4d may be placed such that corresponding orifices 8 of the respective print heads 4a-4d are positioned in-line in the main scanning direction X. This means that a line of image dots in the main scanning direction X may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction X. The image dots are formed by ejecting droplets of marking material from the orifices 8.

The ink jet printing assembly 3 may further comprise curing means 11a, 11b. As shown in FIG. 1A, a scanning print carriage 12 carries the two curing means 11a, 11b and may be moved in reciprocation in the main scanning direction X parallel to the platen 1, such as to enable scanning of the image receiving medium 2 in the main scanning direction X. Alternatively, more than two curing means may be applied. It is also possible to apply page-wide curing means. If page-wide curing means are provided, then it may not be necessary to move the curing means in reciprocation in the main scanning direction X. The first curing means 11a may emit a first beam of UV radiation, the first beam having a first intensity. The first curing means 11a may be configured to provide the radiation for the pre-curing step. The second curing means 11b may emit a second beam of radiation, the second beam of radiation having a second intensity. The second curing means 11b may be configured to provide the radiation for the post-curing step.

The carriage 12 is guided by guiding means 7. These guiding means 7 may be a rod as depicted in FIG. 1A. Although only one rod 7 is depicted in FIG. 1A, a plurality of rods may be used to guide the carriage 12 carrying the print heads 11. The rod 7 may be driven by suitable driving means (not shown). Alternatively, the carriage 12 may be guided by other guiding means, such as an arm being able to move the carriage 12.

The curing means may be energy sources, such as actinic radiation sources, accelerated particle sources or heaters. Examples of actinic radiation sources are UV radiation sources or visible light sources. UV radiation sources are preferred, because they are particularly suited to cure UV curable inks by inducing a polymerization reaction in such inks. Examples of suitable sources of such radiation are lamps, such as mercury lamps, xenon lamps, carbon arc lamps, tungsten filaments lamps, light emitting diodes (LED's) and lasers. In the embodiment shown in FIG. 1A, the first curing means 11a and the second curing means 11b are positioned parallel to one another in the sub scanning direction Y. The first curing means 11a and the second curing means 11b may be the same type of energy source or may be different type of energy source. For example, when the first and second curing means 11a, 11b, respectively both emit actinic radiation, the wavelength of the radiated emitted by the two respective curing means 11a, 11b may differ or may be the same. The first and second curing means are depicted as distinct devices. However, alternatively, only one source of UV radiation emitting a spectrum of radiation may be used, together with at least two distinct filters. Each filter may absorb a part of the spectrum, thereby providing two beams of radiation, each one having an intensity different from the other.

The flat surface 1, the temperature control means, the carriage 5, the print heads 4a-4d, the carriage 12 and the first and second curing means 11a, 11b are controlled by suitable controlling means 10.

Experiments and Examples

Materials

SR 9003 (propoxylated neopentyl glycol diacrylate) was obtained from Sartomer. MEHQ (monomethylethyl of hydraquinone) was obtained from Sigma Aldrich. Stearone was obtained from Alfa Aesar. Pentaerythritoltetrastearate was obtained from NOF Corporation. Irgacure® 379 was obtained from BASF. ITX (2-isopropylthioxanthone) was obtained from Rahn. All chemicals were used as received.

Methods

Gloss

The gloss of an image was measured after the image had been printed and cured. The gloss was measured using a micro-TRI glossmeter obtained from BYK-Gardner GmbH using the internal calibration and measurement method. The micro-TRI gloss measuring device simultaneously measures the gloss under an angle of 20°, 60° and 85°, respectively. The gloss level reported is the gloss level measured under an angle of 60°. A high value relates to a high gloss level, a low value relates to a low gloss level (matt).

Rodcoating

Rodcoats were made by applying a 14 μm thick layer of ink onto a receiving medium. As receiving medium, Avery Dennison MPI2000 was used. MPI2000 is a self-adhesive vinyl medium.

The ink was cured by irradiating the ink layer using a LED lamp emitting radiation having a wavelength of 395 nm.

EXAMPLES

Several ink compositions were prepared. Ink composition Ex 1-Ex 3 comprises pentaerythritoltetrastearate as a gelling agent, in an amount of 1.0 wt % with respect to the total ink composition and is an ink composition according to the present invention. Ink composition CE 1 comprises stearone as a gelling agent and is not ink composition according to the present invention.

Production Example Ex 1

Ink composition Ex 1 was prepared by adding 100 grams of SR9003, 5.0 g of Irgacure® 379, 5.0 gram of ITX and 0.1 gram of MEHQ and 0.5 gram of pentaerythritoltetrastearate to a flask and mixing the ingredients. A colorless ink composition Ex 1 was obtained.

Ink compositions Ex 2, Ex 3 and CE 6 were prepared analogously, but different amounts of pentaerythritoltetrastearate were used, as shown in table 1.

Comparative Example CE 1

The comparative ink composition CE 1 was prepared in a similar way compared to Ex 1. However, no pentaerythritoltetrastearate was used when preparing comparative ink composition CE 1.

The comparative ink composition CE 2 was prepared in a similar way compared to Ex 1. However, 0.5 gram of stearone was used when preparing comparative ink composition CE 1, instead of 0.5 gram of pentaerythritoltetrastearate. Ink compositions CE 3, CE 4 and CE 5 were prepared analogously, but different amounts of stearone were used, as shown in table 1.

The comparative ink composition CE 6 was prepared in a similar way compared to Ex 1, but a different of pentaerythritoltetrastearate was used, as shown in table 1.

TABLE 1

Examples and Comparative examples

| Ink compostion: | Amount of pentaerythritoltetra-stearate: | Amount of stearone | wt % of the gelling agent | |
|---|---|---|---|---|
| Ex 1 | 0.5 | 0 | 0.45 | Inv |
| Ex 2 | 1.0 | 0 | 0.90 | Inv |
| Ex 3 | 2.0 | 0 | 1.8 | Inv |
| CE 1 | 0 | 0 | 0 | Comp |
| CE 2 | 0 | 0.5 | 0.45 | Comp |
| CE 3 | 0 | 1.0 | 0.90 | Comp |
| CE 4 | 0 | 2.0 | 1.8 | Comp |
| CE 5 | 0 | 5.0 | 4.3 | Comp |
| CE 6 | 5.0 | 0 | 4.3 | Comp |

The wt % of the gelling agent shown in table 1 corresponds to the weight percentage of gelling agent present in the ink composition based on the total weight of the ink composition.

Figure 2:
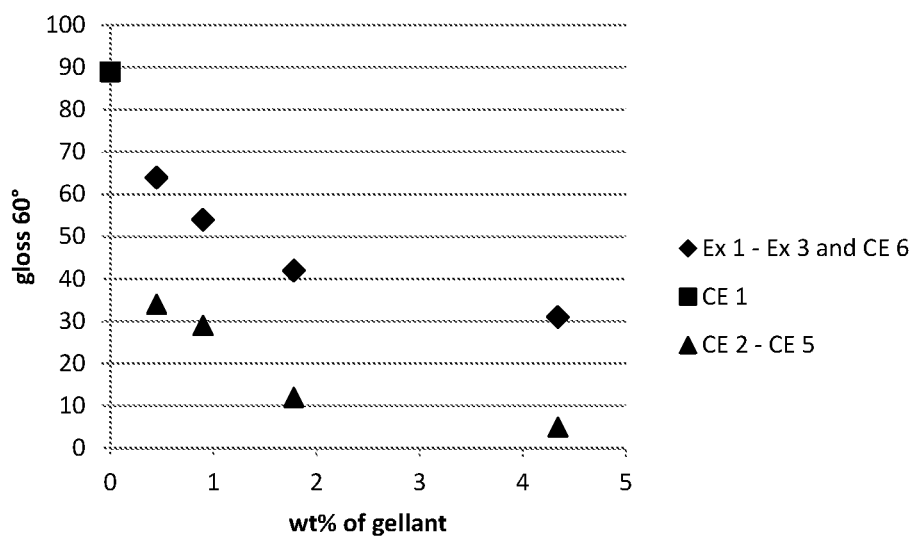
FIG. 2 shows the gloss level of a number of ink compositions as a function of the wt % of gellant.

Rodcoats were made using ink compositions Ex 1-Ex 3 and CE 1-CE 6. The gloss of the rodcoats provided with the (cured) ink compositions was measured. The results are summarized in table 2 and FIG. 2.

TABLE 2

Gloss measurements

| Ink compositions | Gloss |
|---|---|
| Ex 1 | 64 |
| Ex 2 | 54 |
| Ex 3 | 42 |
| CE 1 | 89 |
| CE 2 | 34 |
| CE 3 | 29 |
| CE 4 | 12 |
| CE 5 | 5 |
| CE 6 | 31 |

When comparing the gloss levels of rod coats made with Ex 1-Ex 3 and CE 6 on the one hand to CE 2-CE 5 on the other hand, it is observed that the ink compositions comprising x wt % of pentaerythritoltetrastearate as gelling agent show higher gloss than ink compositions comprising x wt % of stearone as a gelling agent. For example, the gloss level of the rodcoat made with ink composition Ex 1—which is an ink composition according to the present invention—was higher than the gloss level of the rodcoat made with ink composition CE 2, which is not an ink composition according to the present invention.

Rod coats made with ink composition CE 1, which does not comprise a gelling agent, show higher gloss than the other rod coats. However, because ink composition CE 1 is free of gelling ink, no gelling behavior will occur when cooling down the ink. When the ink composition is printed onto a receiving medium, no significant increase in viscosity will occur and hence, the droplets of this ink composition will spread over a relatively large area of the recording medium. This may lead e.g. to color bleeding which results in bad print quality and is therefore unwanted. Therefore, ink composition CE 1 may not provide images having sufficient print quality, when a printing device as shown in FIG. 1A is used to form the image.

Further, it is observed that the gloss decreases upon increasing amount of gelling agent. The more gelling agent is present in the ink composition, the lower the gloss level of images made with the ink composition. However, the decrease in gloss is much lower for ink compositions comprising pentaerythritoltetrastearate than for ink compositions comprising stearone. Therefore, when using a gelling agent in accordance with the present invention in a low amount (i.e. from 0.3 wt %-3.0 wt %), a UV curable gelling ink may be provided that allows obtaining images having high gloss.

Hence, using ink compositions according to the present invention, high gloss levels can be obtained.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A radiation-curable inkjet ink composition comprising a radiation curable component, the radiation-curable inkjet ink composition further comprising an ester compound, the ester compound being a condensation product of a first reactant and a second reactant,
wherein the first reactant is a compound A comprising at least 3 first functional groups, and
wherein the second reactant comprises at least one compound B, wherein the at least one compound B comprises a second functional group,
wherein the first functional group is a first group selected from a hydroxyl functional group and a carboxylic acid functional group and the second functional group is a second group selected from a hydroxyl functional group and a carboxylic acid functional group,
wherein the first functional group is different from the second functional group and
wherein the ester compound is present in an amount of 0.3 wt % or greater and less than 3.0 wt % based on the total weight of the radiation-curable inkjet ink composition.

2. A radiation-curable inkjet ink composition according to claim 1, wherein the compound A is selected from the group consisting of pentaerythritol, cyclodextrine, glycerol, dipentaerythritol, 2-(hydroxymethyl)-2-methylpropane-1,3-diol, 2-ethyl-2-(hydroxymethyl)propane- 1,3-diol, 2-(hydroxymethyl)propane-1,3-diol, trimethylolethane, trimethylolpropane, trimethylolbutane and trimethylolpentane.

3. A radiation-curable inkjet ink composition according to claim 1, wherein the compound B is a compound according to formula I;

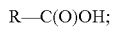

formula I:

wherein R is an alkyl group, an aryl group or an alkylarylgroup, wherein R is a group having 5-30 carbon atoms.

4. A radiation-curable inkjet ink composition according to claim 3, wherein the compound B is a fatty acid.

5. A radiation-curable inkjet ink composition according to claim 2, wherein the ester compound is a fatty acid ester of pentaerythritol.

6. A radiation-curable inkjet ink composition according to claim 5, wherein the ester compound is pentaerythritoltetrastearate.

7. A radiation-curable inkjet ink composition according to claim 1, wherein the radiation curable component is an acrylate having two or more acrylate functional groups.

8. A radiation-curable inkjet ink composition according to claim 7, wherein the ink composition further comprises a monofunctional acrylate.

9. A radiation-curable inkjet ink composition according to claim 1, wherein the ester compound is a gelling agent.

10. A method for preparing the radiation-curable inkjet ink composition according to claim 1, the method comprising the steps of:
providing a radiation curable component;
providing an ester compound, the ester compound being a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group, and wherein the ester compound is present in an amount of 0.3 wt % or greater and less than 3.0 wt % based on the total weight of the radiation-curable inkjet ink composition; and
mixing the radiation curable component and the ester compound.

11. A method for applying an image onto a recording medium, the method comprising the steps of:
a. jetting droplets of the radiation-curable inkjet ink composition according to claim 1 onto the recording medium; and
b. curing the radiation-curable inkjet ink composition by irradiating the ink composition using UV radiation.

12. A radiation-curable inkjet ink composition according to claim 1, wherein the ester compound is present in an amount of 0.3 wt % to 2.5 wt % based on the total weight of the radiation-curable inkjet ink composition.

13. A radiation-curable inkjet ink composition according to claim 1, wherein the ester compound is present in an amount of 0.3 wt % to 2.2 wt % based on the total weight of the radiation-curable inkjet ink composition.

14. A radiation-curable inkjet ink composition according to claim 1, wherein the ester compound is present in an amount of 0.3 wt % to 2.0 wt % based on the total weight of the radiation-curable inkjet ink composition.

* * * * *